United States Patent [19]

Grilli et al.

[11] 4,323,185
[45] Apr. 6, 1982

[54] FRICTION WELDING PROCESS FOR MAKING HOLLOW BODIES SUCH AS ROLLERS AND SIMILAR ARTICLES

[75] Inventors: Walter Grilli; Emidio Manicardi, both of Modena; Ivano Ferrari, Castelnuovo Rangone, all of Italy

[73] Assignee: Italtractor I.T.M. S.p.A., Castelvetro, Italy

[21] Appl. No.: 118,968

[22] Filed: Feb. 5, 1980

[30] Foreign Application Priority Data

Feb. 14, 1979 [IT] Italy ............................ 40022 A/79

[51] Int. Cl.³ ............................................. B23K 20/12
[52] U.S. Cl. ..................................... 228/114; 228/112
[58] Field of Search ................... 228/2, 112, 113, 114

[56] References Cited

U.S. PATENT DOCUMENTS

3,618,196 11/1971 Sluetz .............................. 228/2 X

FOREIGN PATENT DOCUMENTS

44-3462 2/1969 Japan .................................. 228/112
1475678 6/1977 United Kingdom ................ 228/112

Primary Examiner—Robert D. Baldwin
Attorney, Agent, or Firm—Browdy and Neimark

[57] ABSTRACT

A friction welding process that is particularly suitable for welding, one to the other, of two hollow, symmetrical, cylindrical bodies, the union of which forms a roller for tracks on tracked machines, in which the edges of the bodies are shaped along an axial cutting plane in which a front part that projects with respect to a rear part of a greater gage, is recognizable, and in which the said front part is joined to the said rear part on at least one of the sides (internal or external) by means of a concave surface section contacting, at a predetermined angle, the adjacent surface; the shape and size of the front part and of the fillets being predetermined in such a way that the burr that forms during welding is placed tangentially in contact with the fillets in proximity of their edge of contact with the said adjacent surfaces. The front part surface may be given a finish whereby it becomes flat, smooth and devoid of chamfer or a radius at the corners.

4 Claims, 3 Drawing Figures

FRICTION WELDING PROCESS FOR MAKING HOLLOW BODIES SUCH AS ROLLERS AND SIMILAR ARTICLES

BACKGROUND OF THE INVENTION

The invention relates to a friction welding process, in particular for hollow bodies such as rollers and similar.

As a typical example, though not solely for this, it can be gainfully used in the welding of rollers for tracks.

DESCRIPTION OF THE PRIOR ART

Rollers for tracks are normally made by fixedly uniting two identical, hollow, cylindrical bodies placed coaxially and symmetrically one at the side of the other.

Each roller has drilled in it a coaxial through hole which constitutes the coupling pin seating.

Sealing gaskets insulate from the outside the internal cavity of the roller in order to minimize leakages towards the outside of lubricant.

During the friction welding operation numerous particles and fragments of metal are produced and these can remain trapped by the burr that forms with this particular type of welding.

The removal of the said fragments is something that is very difficult and is never fully performed, and this is the cause of problems of some entity in the operation of the roller since the fragments and particles of metal trapped by the internal burr can later work loose and become inserted between the mutually movable coupled surfaces of the roller and of the pin which damages them and causes them to wear rapidly.

What also happens in cases when the part is subjected to a subsequent machining operation wherein the removal of shavings is involved, is that the said shavings get trapped by the internal burr and that they later work loose and become inserted between the mutually movable coupled surfaces of the roller and of the pin which damages them and causes them to wear rapidly.

Naturally in addition to the described case of rollers for tracks, the same problems occur in any similar application in which coupled surfaces that move one with respect to the other are welded in the inside of the part.

Because of the aforementioned difficulties, despite the fact that this method of welding offers considerable known advantages compared with other types of welding systems, such as rapidity and extraordinary welding efficiency, it cannot be gainfully used in numerous cases, one example of which involves making the above described rollers.

SUMMARY OF THE INVENTION

The object of the invention is to overcome the aforementioned difficulties and to thus render friction welding suitable for all purposes.

This and other objects are attained in practicing the invention, essential features of which are that it comprises the careful preparation of the edges of the two bodies to be united, which process includes the precise shaping of the edges along an axial cutting plane in which a front part of a preset gage and length that projects with respect to a rear part of a greater gage is recognizable; the said front part being joined to the said rear part on at least one of the sides (internal or external) by means of a concave surface section contacting, at a predetermined angle, the adjacent surface that laterally delimits the said rear part; the shape and the size of the said front part and of the fillets being predetermined in such a way that the burr formed as a result of the friction welding operation is folded back over itself and is spread out until it has been arranged almost tangentially in contact with the said fillets, in proximity of their edge of contact with the said adjacent surfaces and wherein the friction surface of the said front part of each edge is given a finish whereby it becomes smooth, flat and free of any chamfer, radius or dent at the corners, and has a low roughness coefficient.

BRIEF DESCRIPTION OF THE DRAWINGS

Further characteristics and advantages of the invention will emerge more obviously from the detailed description that follows of a preferred but not sole form of embodiment, illustrated purely as an unlimited example on the accompanying drawings, in which.

DESCRIPTION OF THE PREFERRED EMBODIMENT

Figure 1:
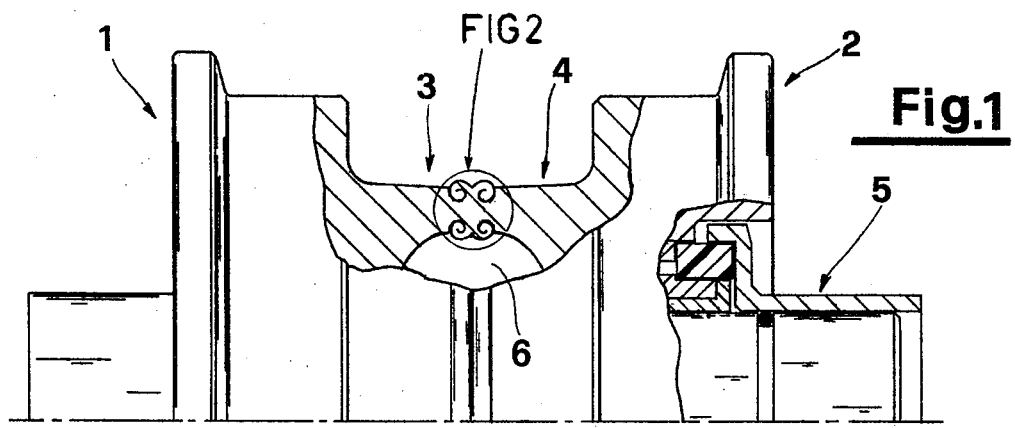
FIG. 1 shows in a front view, partially in sectional form, one embodiment executed in conformity with the invention in question.
Figure 3:
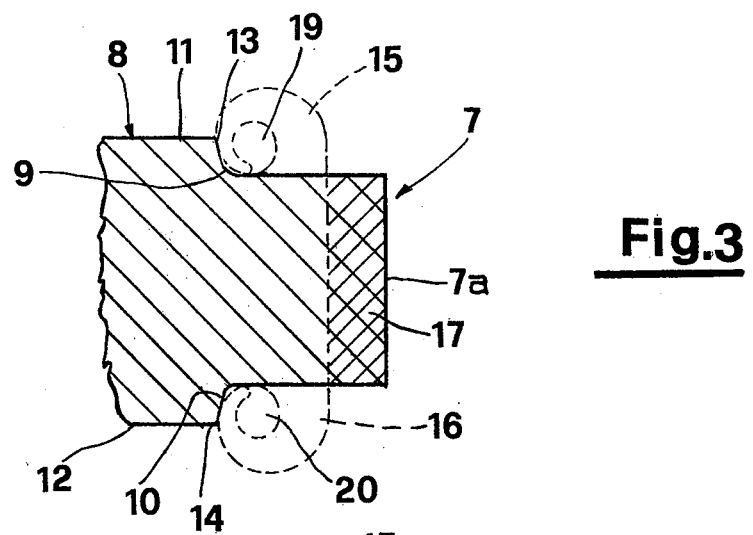
FIG. 3 shows, in a view similar to that illustrated in FIG. 2, one only of the two edges prior to the carrying out of the welding operation, with the broken lines indicating the conformation the edge has after welding.

With reference to the above mentioned figures, at (1) and (2) there are two coaxial, hollow, cylindrical bodies welded symmetrically in the region of their edges (3) and (4) by means of the process forming the subject of the invention. The said two bodies (1) and (2) jointly form one roller for tracks inside which a pin (5) is coupled coaxially with the aid of bearings.

Sealing gaskets fitted between the said pin and the seatings in the two bodies (1) and (2) in which the former is housed insulate from the outside the inner cavity (6) enclosed in between the said bodies in such a way as to keep the lubricant held there inside.

Before the friction welding operation is commenced, the edges (3) and (4) are carefully readied.

In a cutting plane containing the axis of the bodies (1) and (2), the shape of each of the edges (3) and (4) is, prior to the execution of the welding, such that there is a front part (7), of a prefixed gage, that projects with respect to a rear part (8) whose gage is greater.

The front surface (7a) on which at the commencement of the welding operation, the contact between the bodies (1) and (2) occurs, is of circular corona shape and is carefully finished so as to provide a smooth, flat surface devoid of any dent, chamfer or radius at the corners and is such as to have a low roughness coefficient. In this way it is possible, during the welding process, to eliminate the formation of particles and fragments which would otherwise be produced while the welding is taking place. The front part (7) is joined to the rear part (8) at both sides, external and internal, by means of two fillets (9) and (10).

The said fillets (9) and (10) are incident, at predetermined angles, upon the adjacent surfaces (11) and (12) at the edges (13) and (14).

In proximity of the said edges of incidence, the said fillets (9) and (10) have an inclination of approximately 15° with respect to a plane perpendicular to the axis of the two bodies (1) and (2).

The friction welding takes place with the two bodies (1) and (2) being rotated, one with respect to the other, around a common axis, and being kept pressed one against the other in the region of their respective front surfaces (7a) which rub one on the other.

The proportioning in shape and size of the front part (7) and of the fillets (9) and (10) with respect to the rear part (8) is predetermined to suit the inner and outer burr (15) and (16) that forms as a result of the welding operation, in such a way that the burr folds back over itself and is spread out until it has been arranged almost tangentially in contact with the said fillets (9) and (10), in proximity of their edges (13) and (14).

The extension of the burr is determined by the ratio between the dimensions of the section of material (17) whose axial depth corresponds to the overall loss in length each of the bodies suffers upon completion of the welding operation.

The burr (15) and (16) extend tangentially on contact with the fillets (9) and (10) and insulate between their inner surfaces and the said fillets, two annular closed compartments (19) and (20).

The surface of the front part (7) of the edges is subjected to machining both in order to give it, as described above, a surface (7a) that is smooth, flat and devoid of any dent, chamfer or radius at the corners, and has a low roughness coefficient, and in order to achieve a precise shape, with the aforementioned characteristics, for the front part (7) and the fillets (9) and (10).

Furthermore, the said machining operation serves to render, at the time the welding is taking place, the two surfaces (7a) mating perfectly and placed in a strictly coaxial fashion.

Thanks to the said machining of the surface (7a), the formation of particles and fragments which could otherwise remain trapped between the burr (15) and (16) and the corresponding surfaces (9) and (10), is prevented during the welding operation. If the said particles were to subsequently work loose, they could seriously damage the reciprocally movable coupled surfaces.

Figure 2:
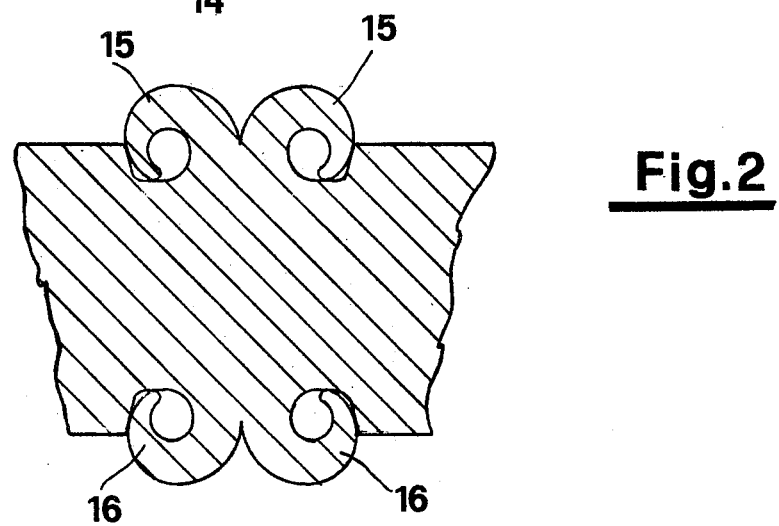
FIG. 2 shows, in an enlarged scale, one detail of FIG. 1 that refers to two edges welded in accordance with the process in question.

Additionally, because of the conformation the profile of the welded edges is given, wherein the formation of accentuated concavities is prevented, (as can be seen in FIG. 2) any danger of shavings or particles resulting from the subsequent machining of the welded part remaining trapped or restrained by the burr in the region of the edges (13) and (14), is completely overcome.

Numerous modifications of a practical nature may obviously be made to the constructional details of the invention without, in any way, deviating from the framework of protection afforded to the conceptual ideas behind the invention, as claimed below.

What is claimed is:

1. A friction welding process, in particular for making hollow bodies such as rollers and similar articles, essential features of which process include the preparation of the edges of the two bodies to be head-on united, said process comprising: precisely shaping said edges along an axial cutting plane in which a front part of a preset gage and length visibly projects with respect to a rear part of a greater gage, the said front part being joined to the said rear part on at least one of the sides by means of a fillet comprising a concave surface section contacting, at a predetermined angle, the adjacent surface that laterally delimits the said rear part; carefully finishing the friction surface of the said front part of each edge with a finish whereby it becomes smooth, flat and free of any dent, chamfer or radius at the corners, and has a low roughness coefficient; rotating said bodies, one with respect to the other, around a common axis, while pressing one against the other in the region of their respective front surfaces, whereby said bodies are friction welded together and a burr is formed on each body as a result of the friction welding operation, which burr is folded back over itself and is spread out until it has been arranged tangentially in contact with the said fillet, in proximity of its edge of contact with the said adjacent surface.

2. A process according to claim 1, wherein the said edges are perfectly coaxial and symmetrically identical with respect to a plane perpendicular to the common axis.

3. A process according to claims 1 or 2, wherein the said fillets have, in proximity of their edge of contact with the said adjacent surfaces, an inclination of approximately 15° with respect to a plane perpendicular to the said axis.

4. A process according to claims 1 or 2, wherein the profile of the welded edges has is so formed as not to have in it accentuated concavities.

* * * * *